Aug. 5, 1969     J. R. HOUCK ET AL     3,460,063
ULTRASONIC TRANSDUCER
Filed July 26, 1968
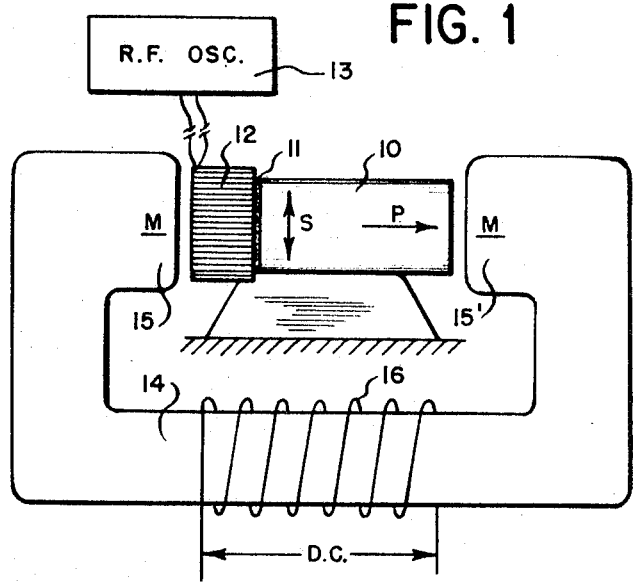
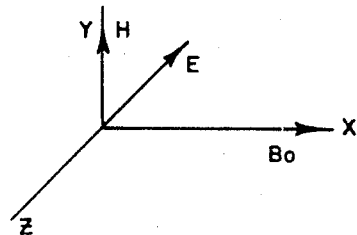
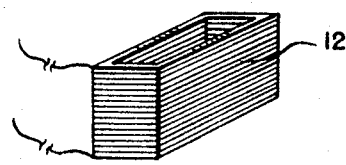
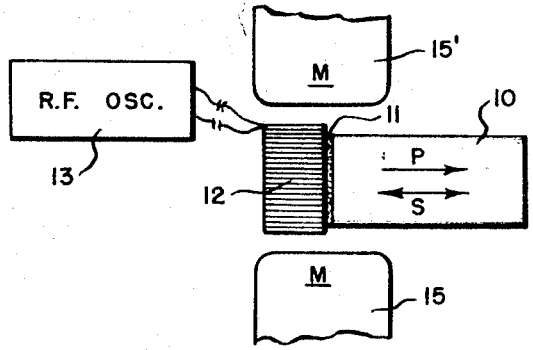
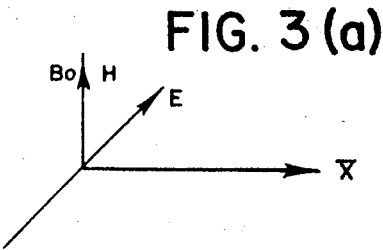
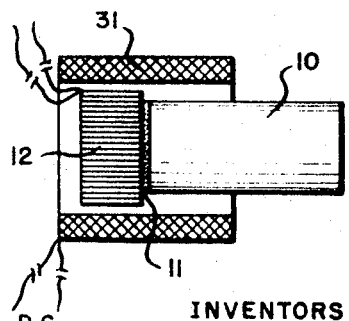
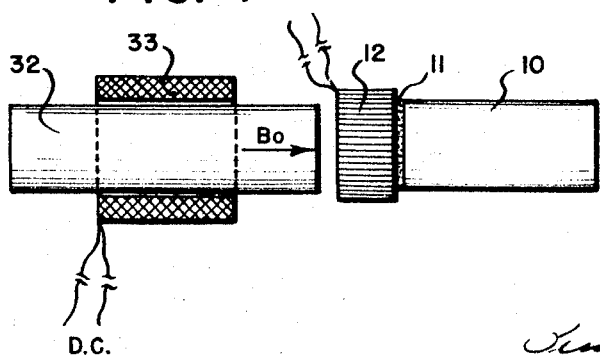
INVENTORS
JAMES R. HOUCK
HENRY V. BOHM
BRUCE W. MAXFIELD
BY
ATTORNEYS

INVENTORS
JAMES R. HOUCK
HENRY V. BOHM
BRUCE W. MAXFIELD

ATTORNEYS

United States Patent Office 3,460,063
Patented Aug. 5, 1969

3,460,063
ULTRASONIC TRANSDUCER
James R. Houck, 610 Mitchell St., Ithaca, N.Y. 14850, Henry V. Bohm, 13348 Talbot, Huntington Woods, Mich. 48070, and Bruce W. Maxfield, 215 Muriel St., Ithaca, N.Y. 14850
Filed July 26, 1968, Ser. No. 748,023
Int. Cl. H04b 11/00; G10k 11/00
U.S. Cl. 340—15                                    9 Claims

ABSTRACT OF THE DISCLOSURE

An ultrasonic transducer comprises a body having a conductive surface, means such as a coil for producing or responding to an electromagnetic field at the conductive surface, and a DC magnet producing a magnetic field at the conductive surface having a major component perpendicular to the electric vector of the electromagnetic field. The $\omega_c \tau$ product is less than about unity, where $\omega_c$ is the cyclotron frequency and $\tau$ is the electron relaxation time. Ultrasonic waves are produced or detected by the direct coupling of RF currents in the conductive surface with the positive ion lattice of the surface or, stated differently, by the direct coupling of the electromagnetic fields of the RF and ultrasonic waves, in the presence of the DC magnetic field.

Background of the invention

Ultrasonic transducers are known for producing ultrasonic waves in response to an applied AC wave, and vice versa. Piezoelectric and magnetostrictive transducers are most common. Such transducers are limited to materials exhibiting the required effects, and frequently use mechanically resonant structures which limit their bandwidth. Also, extremely high ultrasonic frequencies in the range of a few hundred MegaHertz are difficult to generate.

The transducer of the present invention does not rely on piezoelectric or magnetostrictive effects, and a wide range of electrically conductive materials may be employed. The generation or detection of ultrasonic waves does not require mechanical resonance, and operation over a wide frequency range is possible.

Broadly speaking, the transducer of the invention utilizes the interaction of an RF electromagnetic field and a DC magnetic field in the surface of a conductive body, or in a thin metal layer on a non-conductive substrate, to produce ultrasonic waves in the body.

The excitation of ultrasonic waves in metal by helicon-phonon coupling is known. In general a pure metal and very low temperatures such as that of liquid helium (4.2° K.) are required. Helicon waves are excited in the metal by an electromagnetic field in the MegaHertz region in the presence of a strong DC magnetic field. In order to excite helicon waves of satisfactory intensity which will propagate through the metal, conditions are commonly chosen such that the product $\omega_c \tau$ is large compared to unity. Here $\omega_c$ is the cyclotron frequency equal to $eB/(mc)$ where $e$ is the electron charge, B the DC magnetic field, $m$ the effective electron mass for motion of electrons in the medium, and $c$ the velocity of light. $\tau$ is the relaxation time of electrons, and may be expressed as equal to $\sigma m/(ne^2)$ where $\sigma$ is the electrical conductivity and $n$ the electron density. As the product $\omega_c \tau$ approaches unity, the helicon waves become very weak and strongly damped, and near unity they become negligible for practical purposes.

A further condition must be satisfied in order for helicon-phonon coupling to produce untrasonic waves effectively, namely, the phase velocity of the helicon waves in the metal should be approximately equal to the phase velocity of acoustic waves therein. Helicon phase velocity varies as the square root of the DC magnetic field at a given frequency, hence imposing an additional requirement on the magnetic field employed.

Although the phenomenon is of considerable interest to physicists in gaining a better understanding of the properties of matter, the requirements of purity of metal, very low temperatures and strong magnetic fields seriously limit its usefulness outside the scientific laboratory.

Experiments relating to helicon wave phenomena have been reported (Larsen and Saermark "Helicon Excitation of Acoustic Waves in Aluminum," Physics Letters, vol. 24A, No. 7, 1967, pp. 374–5), in which the experimental conditions were not such as to produce propagation of helicon waves in the metal, nor equal phase velocities of helicon and acoustic waves. As reported, these experiments used aluminum crystals at 4.2° K., electromagnetic fields in the MegaHertz region, and DC magnetic fields up to 40 kilo-oersteds. It is reported that, although no helicon-like signal was observed, at certain rather sharply defined frequencies the coil arrangements employed yielded signals from which it was deduced that half-wave resonance of acoustic waves in the metal crystal was present. An explanation was given that possibly the acoustic waves were being produced by Fourier components of strongly damped helicon waves coupling with the acoustic waves to excite the acoustic cavity.

We have discovered that ultrasonic waves may be produced in the surface of conductive material by direct electromagnetic excitation in the presence of a DC magnetic field, and that the production of ultrasonic waves is not limited to conditions required for helicon-phonon coupling. In particular, ultrasonic waves may be produced over a wide range of temperatures, with other than pure metals, and with only moderate DC magnetic fields. As a result, ultrasonic transducers may be constructed and used under a wide variety of conditions not envisaged heretofore.

Summary of the invention

The transducer of the invention comprises a body of material at least one surface of which is electrically conductive, means for producing an electromagnetic field at the conductive surface, and means for producing a DC magnetic field having a major component perpendicular to the electric vector of the electromagnetic field at the conductive surface.

The body may be entirely of conductive material, or a conductive layer firmly affixed to a non-conducting substrate. For example, a thin film of metal may be plated by evaporation or other suitable means onto a non-conducting substrate, or a film of one metal may be plated onto a dissimilar metal. A piece of aluminum foil cemented to a quartz rod has been employed with success.

The electromagnetic field may be produced in any desired manner. A coil placed adjacent the conductive surface and energized with AC of desired frequency is suitable. Advantageously a flat coil closely adjacent the conductive surface, but insulated therefrom, is employed. The DC magnetic field may be produced by an electromagnet or a permanent magnet as desired.

With suitable choice of parameters, as described more fully hereinafter, ultrasonic waves at the frequency of the electromagnetic field are produced in the conductive surface and propagate in the body in a direction generally perpendicular to the conductive surface. The orientation of the DC magnetic field with respect to the magnetic vector of the electromagnetic field determines the type of ultrasonic wave, and transverse (shear) waves and longitudinal (compressional) waves have been produced.

The production of the ultrasonic waves may be explained briefly as follows: The electromagnetic field, being an oscillating field, causes oscillations of the electrons in the conductive surface. Without the DC magnetic field, the electrons shield the positive ions and effectively no motion of the positive ion arises. However, in the presence of the DC magnetic field, the motion of the electrons is restricted by the Lorenz force acting thereon, so that they are unable to shield the ions. On an atomic scale, a sound wave in a metal is an oscillating motion of the positive metal ions. Since there is a coupling of the applied electromagnetic wave with the positive ions, an acoustic wave at the frequency of the applied wave is generated. In effect, RF currents in the surface of the metal couple directly to the lattice of the metal in the presence of the DC magnetic field, resulting in the production of an ultrasonic wave at the frequency of the RF currents.

The detailed explanation of the phenomenon is quite complicated, and has been dealt with in a paper by Houck et al., Physical Review Letters, vol. 19, No. 5, 1967, pp. 224–226. Broadly it may be stated that, in the presence of a DC magnetic field, the electromagnetic fields of the applied wave couple directly with the electromagnetic fields of the acoustic wave.

The above description applies directly to the generation of ultrasonic waves. However, it will be understood that the converse operation will also take place, that is, an ultrasonic wave impinging on the metal surface will produce RF currents in the coil. In such case the electromagnetic fields of the ions act as the driving field producing electronic RF currents.

Inasmuch as the RF currents used to generate and detect ultrasonic waves are confined to a very thin surface layer, thin metal films deposited on non-conducting substrates can be employed.

It will be understood that although the above explanation of the theory underlying the phenomenon is believed to be generally correct, it is subject to further refinement and elaboration. Regardless of the exact mechanism involved, we have found that ultrasonic waves may be produced by an electromagnetic field and a DC magnetic field under conditions not heretofore envisaged, and particularly under conditions such that the known helicon-phonon coupling cannot exist to a substantial degree.

The phenomenon is not limited to very pure metals and very low temperatures, nor to very high DC magnetic fields. Aluminum silver and commercial grade aluminum foil were initially employed with success, and subsequently the phenomenon has been observed in many other metals and conductive materials. Moderate DC magnetic fields in the range of 5 to 10 kilogauss have been employed with success, the response being proportional to the magnetic field strength, and tests indicate that weaker fields down to one kilogauss or below may be sufficient for some applications. Operation at room temperatures is also feasible.

These facts are related by the product $\omega_c\tau$, since $\omega_c$ involves the DC magnetic field strength B, and $\tau$ involves metal purity (or impurity) as well as temperature. In the transducer of the invention, the factors are chosen such that $\omega_c\tau$ is less than about unity.

Brief description of the drawings

FIG. 1 shows a transducer in accordance with the invention which produces shear ultrasonic waves, and FIG. 1(a) shows the directions of the applied fields;

FIG. 2 shows an RF coil usable in FIG. 1;

FIG. 3 shows a modification of FIG. 1 for producing longitudinal ultrasonic waves, and FIG. 3(a) shows the directions of the applied fields;

FIGS. 6 and 7 show alternative means for producing the DC magnetic field in the embodiment of FIG. 1.

Description of the specific embodiments

Figure 4:
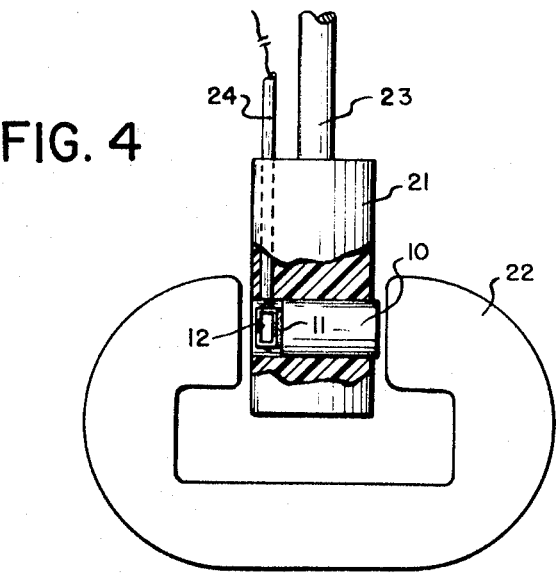
FIGS. 4 and 5 show an arrangement capable, alternatively, of producing either shear or longitudinal waves, the field directions being shown in FIGS. 4(a) and 5(a)

Referring to FIGS. 1 and 1(a), a solid body 10 having a conductive surface 11 is shown. Body 10 may be conductive or non-conductive as desired. A coil 12 energized by RF oscillator 13 is positioned to produce an electromagnetic field at the conductive surface 11 having an electric vector E and a magnetic vector H in the directions shown in FIG. 1(a). Oscillator 13 may be continuous wave or pulsed RF, as desired. The body 10 and coil 12 may be supported in desired manner, indicated by the ground plane. An electromagnet having a core 14, poles 15, 15', and coil 16 energized with DC produces a DC magnetic field B in the direction indicated in FIG. 1(a). With the field directions shown, ultrasonic waves having the frequency of the RF oscillations are produced which propagate perpendicular to the conductive surface 11 as indicated by arrow P. The direction of particle motion is indicated by the doubleheaded arrow S and corresponds to shear type ultrasonic waves.

It will be observed that the DC magnetic field B is perpendicular to the electric vector E. The latter may be considered to be a line in the conductive surface 11 which is perpendicular to the axis of coil 12.

As a detailed embodiment, body 10 may be a quartz rod, conductive surface 11 may be a piece of commercial grade aluminum foil about 0.2 mm. thick, and the DC magnetic field about 10 kilogauss. The $\omega_c\tau$ product is of the order of 0.06 at 4.2° K. and 0.002 at 300° K. (room temperature).

Indium, aluminum and silver of nominal purity may have values for $\omega_c\tau$ of the order 0.05–0.7 at 42° K., 0.0005–0.02 at 77° K. (boiling point of liquid nitrogen) and 0.0001–0.005 at 300° K., with a B of 10 kilogauss. Other metals have comparable values. Actually values will vary with purity, but the values at 300° K. and 77° K. are not as sensitive to purity as at 4.2° K.

FIG. 2 shows a suitable RF coil for coil 12 in FIG. 1. Turns of fine wire are wound into a coil of rectangular cross-section, with one side placed adjacent the conductive surface 11. If the coil is insulated, it may be cemented to the surface 11. The coil may be designed to suit the RF generator 13. A ten turn coil energized from a commercial generator delivering RF pulses of the order of 100 watts peak power has been employed with success, although the impedance match is not believed optimum. The RF frequency may be selected as desired, tests indicating that operation from a few MegaHertz to a few hundred MegaHertz is feasible, and lower higher frequency operation is believed possible.

FIG. 3 shows an arrangement similar to FIG. 1, but in which the magnet poles 15, 15' are reoriented to produce a field B parallel to the conductive surface 11. As shown in FIG. 3(a) the DC field B is still perpendicular to the electric vector E of the electromagnetic field, but is now parallel to the magnetic vector H. The direction of propagation P of the ultrasonic waves is perpendicular to the surface 11, as before. However, the direction of particle motion S is now also perpendicular to the surface 11, yielding longitudinal (compression) waves in body 10.

Figure 4A:
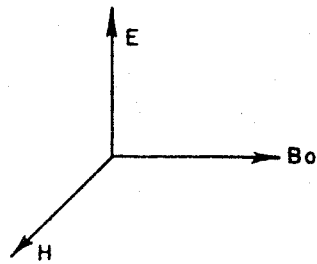
Figure 5:
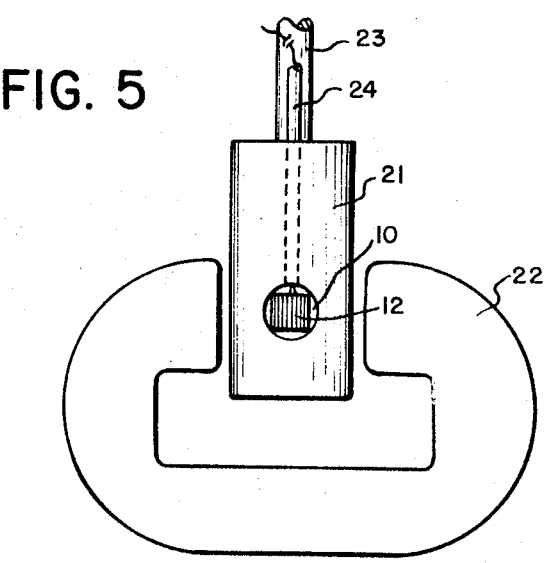

FIGS. 4 and 5 show an arrangement for producing alternatively either shear or longitudinal waves, depending on the orientation of holder 21. Here a permanent magnet 22 is shown. Body 10 with conductive surface 11, and coil 12 are mounted in a non-magnetic holder 21 supported by rod 23. An RF cable 24 is provided for energizing coil 12. In the orientation shown in FIG. 4 the applied fields are as in FIG. 4(a). These are like those of FIG. 1(a), with E and H rotated 90° about the X axis due to the change in orientation of coil 12, resulting in ultrasonic shear waves propagating down rod 10.

Figure 5A:
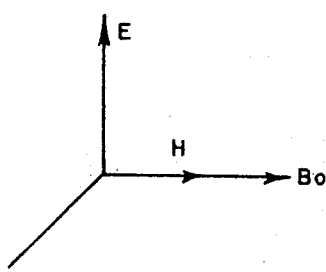

FIG. 5 shows the holder 21 rotated 90° about its axis. The orientations of the applied fields shown in FIG. 5(a) have the same relative orientation as those of FIG. 3(a), resulting in longitudinal waves propagating down rod 10.

Figure 8:
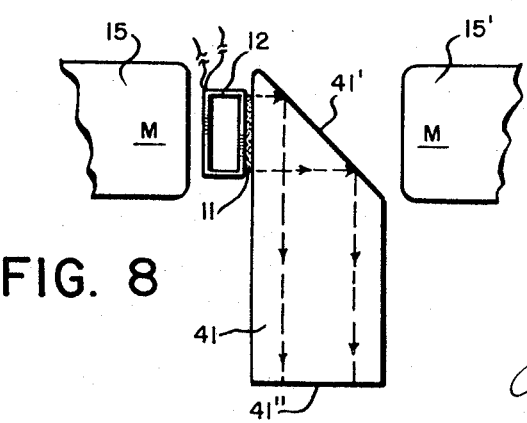
FIG. 8 shows a further modification of FIG. 1, the field directions being shown in FIG. 8(a).

In FIGS. 1 and 4 the presence of magnet pole 15' at the end of body 10 may restrict the usefulness of the transducer, although the spacing may be greater than that shown if the magnet is sufficiently powerful. FIGS. 6–8 show several ways of avoiding the restrictioin, if desired.

In FIG. 6 the DC magnet is replaced by a solenoid 31 energized with DC to produce a magnetic field in the direction of its axis, and the conductive surface 11 is located inside the solenoid. Thus the field orientations are as in FIG. 1(a).

In FIG. 7 a bar type electromagnet comprising a core 32 and solenoid 33 is employed. The end adjacent coil 12 produces a field B approximately perpendicular to the conductive surface 11, as indicated.

Figure 8A:
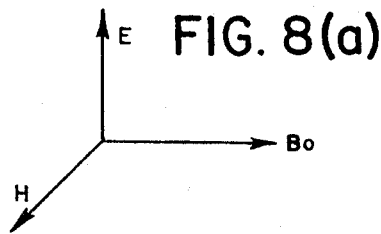

FIG. 8 shows the use of reflection at the interface of an isotropic solid such as fused quartz to change the direction of propagation of the ultrasonic wave. Rod 41 has one surface 41' at 45° to the axis of the rod. The conductive surface 11 is positioned opposite surface 41', with coil 12 adjacent thereto. The directions of the applied fields are shown in FIG. 8(a), and are mutually orthogonal as in FIG. 1(a). However, the direction of the magnetic vector H is made parallel to surface 41', by orienting coil 12 with its axis perpendicular to the plane of the paper, to produce shear waves propagating toward surface 41' and polarized parallel to the surface. At the interface between the solid and air, at surface 41', the ultrasonic waves are reflected and propagate down the rod 41 toward face 41'' as shear waves polarized parallel to the surface 41'.

The field orientations shown in the drawings are those which may be expected to produce optimum amounts of the particular types of ultrasonic waves described. It will be understood, however, that departures from the optimum relationships shown may be made. In general, if the applied fields have major components in the directions shown, corresponding types of ultrasonic waves will be produced. Or, the DC magnetic field may be oriented to produce both shear and longitudinal waves. In FIG. 8, coil 10 could be rotated so that the polarization of the shear wave is no longer parallel to surface 41', in which case the reflected ultrasonic wave would have both shear and longitudinal components.

In the specific embodiments as described, the transducers function as generators of ultrasonic waves. However, the reciprocal detector operation is also possible. That is, ultrasonic waves can be converted to RF signals as well as vice versa. Thus ultrasonic waves impressed on body 10, of the type described for each transducer, will produce an RF signal in coil 12. In such case the oscillator 13 may be replaced by an amplifier and suitable indicating equipment. As will be understood, coil 12 serves as means for producing or responding to an electromagnetic field at the conductive surface, depending on whether the transducer is used to generate or detect ultrasonic waves. Such reciprocal operation of ultrasonic transducers is well known and need not be described further.

It will be understood that whether the transducer is used to generate or detect ultrasonic waves, the direction of the electric vector E with respect to the DC magnetic field B may be specified on the assumption that an RF signal is applied to the coil 12 or other RF means, whether or not it is so applied in use. In either case the coil or other RF means is electromagnetically coupled with the conductive surface 11.

Inasmuch as the ultrasonic waves are generated or detected in a thin surface layer 11, the remainder of body 10 can be selected to meet the requirements of the particular application. For example, it may be selected to have a low attenuation to ultrasonic waves at the frequencies and temperatures used. If it is desired to produce or detect ultrasonic waves in a fluid, the material of body 10 may be selected according to acoustic impedance match considerations. Although flat conductive surfaces are specifically shown, other shapes may be employed if desired. Also, since the generation or detection of ultrasonic waves is not dependent on mechanical resonance, operation over a wide frequency range is possible and body 10 may be designed accordingly.

We claim:

1. An ultrasonic transducer which comprises:

a body having a conductive surface, means for producing a DC magnetic field at said conductive surface, RF means adapted to produce an electromagnetic field at said conductive surface upon application of an RF signal thereto, said RF means and said DC magnetic field being oriented so that a major component of the DC magnetic field is perpendicular to the electric vector of the electromagnetic field produced at said conductive surface upon application of a said RF signal, said conductive surface in the presence of said DC magnectic field having a cyclotron frequency $\omega_c$ and an electron relaxation time $\tau$ yielding an $\omega_c \tau$ product less than about unity, whereby an ultrasonic wave propagating in said body generally perpendicular to said conductive surface is produced when a said RF signal is applied to said RF means or an RF signal is produced in said RF means when a similar ultrasonic wave is applied to said body.

2. An ultrasonic transducer in accordance with claim 1 in which said conductive surface is of metal.

3. An ultrasonic transducer in accordance with claim 1 in which said body is of non-conducting material with a conductive surface affixed thereto.

4. An ultrasonic transducer in accordance with claim 1 in which said major component of the DC magnetic field is generally perpendicular to said conductive surface.

5. An ultrasonic transducer in accordance with claim 1 in which said RF means is a coil positioned adjacent said conductive surface with the coil axis extending laterally of said surface, said major component of the DC magnetic field being perpendicular to a line in said conductive surface which is generally perpendicular to said coil axis.

6. An ultrasonic transducer in accordance with claim 5 in which said conductive surface is flat and the side of said coil adjacent thereto is substantially flat.

7. The method of producing or detecting in a body having a conductive surface an ultrasonic wave which propagates in a direction generally perpendicular to said surface comprising producing a DC magnetic field at said conductive surface and positioning an RF element in electromagnetic coupling relationship with said surface with orientations such that if an RF signal is applied to said RF element an electromagnetic field will be produced at said conductive surface in which the electric vector is perpendicular to a major component of said DC magnetic field, said conductive surface in the presence of said DC magnetic field having a cyclotron frequency $\omega_c$ and an electron relaxation time $\tau$ yielding an $\omega_c\tau$ product less than about unity.

8. The method according to claim 7 in which said RF element is a coil, and said orientations are with the coil axis extending laterally of said conductive surface and with the major component of the DC magnetic field perpendicular to a line in said conductive surface which is generally perpendicular to the coil axis.

9. The method of producing in a body having a conductive surface an ultrasonic wave which propagates in a direction generally perpendicular to said surface comprising producing an electromagnetic field at said conductive surface, and producing at said conductive surface a DC magnetic field having a major component perpendicular to the electric vector of said electromagnetic field at said surface, said conductive surface in the presence of said DC magnetic field having a cyclotron frequency $\omega_c$ and an electron relaxation time $\tau$ yielding an $\omega_c\tau$ product less than about unity.

References Cited

UNITED STATES PATENTS 3,196,384   7/1965   Dumke et al.

RODNEY D. BENNETT, JR., Primary Examiner.

D. C. KAUFMAN, Assistant Examiner

U.S. Cl. X.R.

181—000

M-3403

PO-1050
(5/69)

UNITED STATES PATENT OFFICE
CERTIFICATE OF CORRECTION

Patent No. 3,460,063            Dated August 5, 1969

Inventor(s)    James R. Houck et al.

It is certified that error appears in the above-identified patent and that said Letters Patent are hereby corrected as shown below:

Col. 4, line 48, "42° K." should be -- 4.2° K. --;
, line 51, "Actually" should be -- Actual --;
, line 65, insert -- and -- between "lower" and "higher".

SIGNED AND
SEALED

DEC 23 1969

(SEAL)
Attest:

Edward M. Fletcher, Jr.
Attesting Officer

WILLIAM E. SCHUYLER, JR.
Commissioner of Patents